Figure 1:
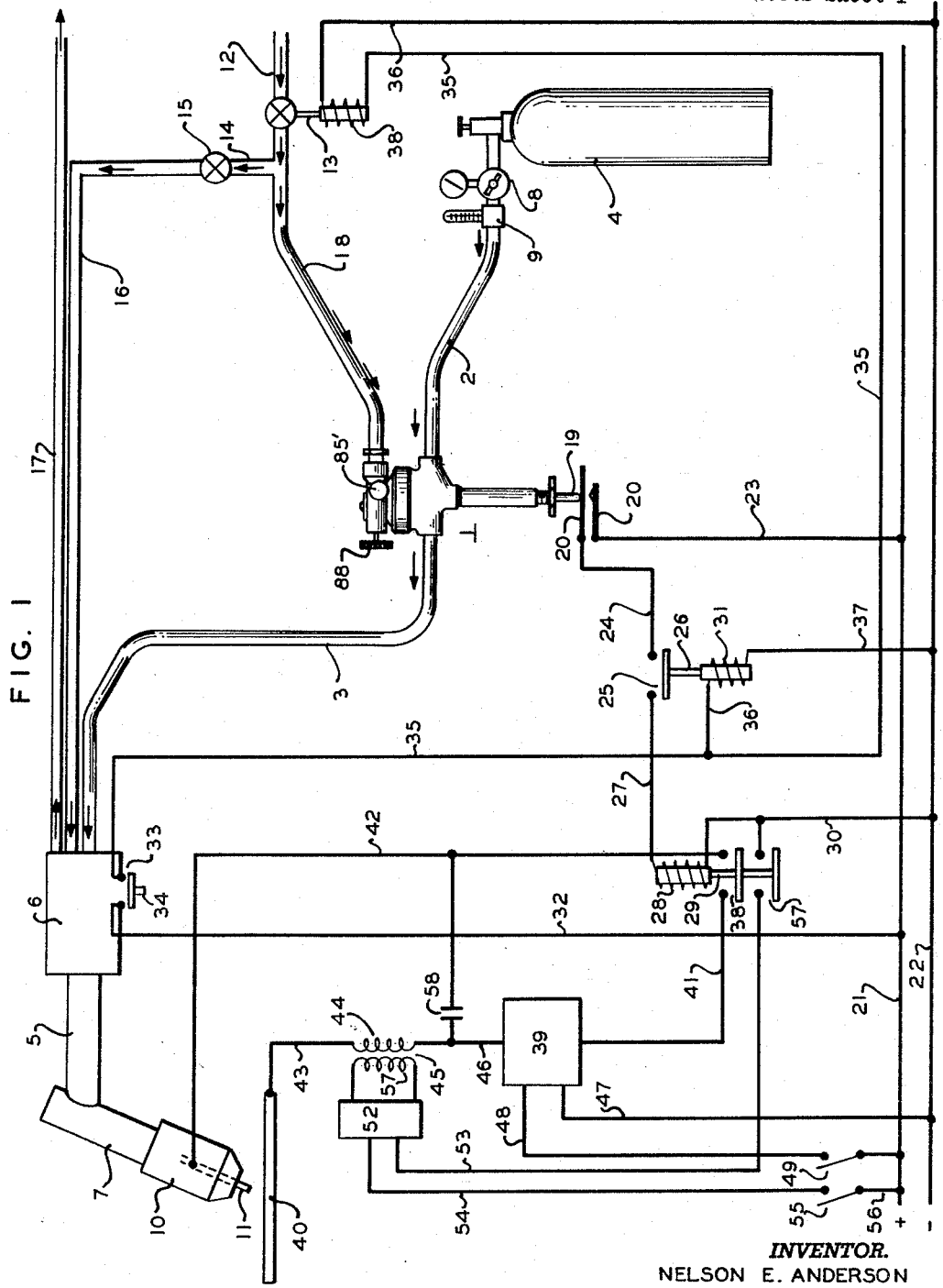

May 5, 1964 N. E. ANDERSON 3,132,235
PILOT OPERATED CONTROL DEVICE
Original Filed April 28, 1958 2 Sheets-Sheet 2

SWITCH 20 ADJUSTABLY POSITIONED ON VALVE BODY AND PERMITS OVERTRAVEL OF PLUNGER 19.

INVENTOR.
NELSON E. ANDERSON
BY
ATTORNEYS

United States Patent Office 3,132,235
Patented May 5, 1964

3,132,235
PILOT OPERATED CONTROL DEVICE
Nelson E. Anderson, Berkeley Heights, N.J.; Severa B. Anderson, administratrix of said Nelson E. Anderson, deceased; said Nelson E. Anderson assignor to Air Reduction Company, Incorporated, New York, N.Y., a corporation of New York
Continuation of application Ser. No. 731,317, Apr. 28, 1958. This application Aug. 22, 1961, Ser. No. 134,537
15 Claims. (Cl. 219—75)

My invention relates to pilot operated control devices and more specifically to such devices which are of particular utility in protecting and controlling the operation of gas shielded arc welding apparatus.

This application is a continuation of my copending application Serial No. 731,317 filed April 28, 1958, now abandoned.

In gas shielded arc welding, a suitable gas is supplied about the electrode and the molten portions of the work and cooling water is usually supplied to the electrode holder and its connections in the welding torch as well as about the welding cable connected to the torch in order to prevent destructive heating of these parts by reason of the high current densities employed therein in order to reduce their weight and thus the fatigue imposed on the operator who must handle them when performing a welding operation. Furthermore, the torch gas nozzle which surrounds the arcing tip of the electrode in the torch is directly subjected to the heat of the welding arc and water cooling of this part is desirable in order to increase its operative usefulness.

In gas-arc welding it is generally the practice to initiate the flow of gas before the welding arc is established and to maintain this gas flow for a period of time after the welding arc has been interrupted at the end of the welding operation. The pre-welded gas flow purges the gas passages about the electrode and the work and insures that the welding arc operates in the desired atmosphere which will also serve to protect the electrode from oxidation by the surrounding air. The post-weld gas flow also protects the hot electrode from oxidation by the air and permits the molten weld metal to cool and solidify while being protected from oxidation by the surrounding air.

Gas-arc welding apparatus may embody either consumable electrodes that are fed to the arc as they are fused and deposited in the weld or non-consumable electrodes, such as tungsten, which deposit no metal in the weld. Tungsten electrodes are readily oxidized when the welding operation is performed in air and such oxidation is prevented by pre-weld and post-weld shielding the electrode with a suitable gas. This gas shielding also insures the desired operating characteristics of the arc. The shielding gases commonly employed are argon, helium and mixtures thereof to which at times additions of oxygen, carbon dioxide or some other gas are made to secure certain desirable results. These gases are expensive and consequently are supplied only when needed during the welding operation. This is equally true when a less expensive shielding gas, such as carbon dioxide, is used in performing the welding operation.

Provision must also be made to prohibit the use of the apparatus for welding if an adequate flow of cooling water therein is not obtained. Any device that protects against inadequate water flow through the apparatus is quite expensive and it has been deemed satisfactory to provide a pressure sensitive device that will not allow operation of the apparatus if the water pressure falls below a predetermined minimum. Since a momentary drop in water pressure can generally be tolerated, an added refinement in the form of a thermal time-delay is sometimes added so that water pressure drops of short duration will not cause shut down of the apparatus.

It is thus obvious that gas-arc welding apparatus generally requires certain control elements to protect against inadequate cooling water flow and to provide pre-weld and post-weld gas shielding of the electrode and the work as part of each welding operation which may be of considerable duration as when making a line weld or of short duration as when making tack or spot welds. These control elements comprise time delay devices, a pressure sensitive switch, and solenoid operated valves or their equivalents.

Inexpensive thermal-type time-delay devices are excellent for use with a pressure switch to prevent outage due only to momentary loss of water pressure. In fact this type is preferable since it is an integrating device, simulates the heating of the apparatus due to the lack of water, and would shut down the apparatus in the event that the pressure drops become frequent. The slow reset characteristics of thermal delay devices make them unsuitable for gas pre-weld and post-weld shielding purposes. High timing accuracy is not required for pre-weld and post-weld shielding and it is possible to buy time-delays relays of sufficient accuracy at low prices but these relays are not reliable in that they often fail to function at all. Consequently in the past it has been found necessary to use expensive pneumatic timers in order to obtain reliable timing operations.

It is an object of my invention to provide at reduced cost a control device which will protect gas-arc welding apparatus against inadequate cooling water flow and provide for such apparatus means for obtaining pre-weld and post-weld gas shielding operations of different and adjustable time periods.

It is also an object of my invention to provide a device embodying a valve and a switch which are sequentially operated by a flexible chamber embodying a diaphragm or bellows which is movable against a biasing means by fluid under pressure which is supplied to and exhausted from the flexible chamber at different metered rates to obtain time-delay periods of different durations between the forward and reverse operation of the valve and the switch.

It is a further object of my invention to provide a device which is suitable for protecting and controlling gas-arc welding apparatus in response to the pressure of the water supplied for cooling the apparatus.

It is another object of my invention to provide such a device which embodies most of the structural elements of a gas pressure regulator such as may be used for controlling the flow of gas during an arc welding operation, so that full advantage may be taken of the low cost of mass producing the parts of these devices and of the convenience of stocking them for replacement purposes.

Further objects of my invention will become apparent from the following description of one embodiment thereof.

In apparatus embodying my invention a flexible diaphragm acts through a thrust pin on the movable valve element of a valve. This valve element is biased to a position in which it closes the passage through the body portion of the valve by a spring which acts on a plunger and forces one end thereof against the valve element on the side thereof which is opposite its side which is engaged by the thrust pin. The other end of the plunger projects from the body portion of the valve and operates an electric switch adjustably positioned relative thereto for engagements by the plunger upon a predetermined movement thereof against the biasing action of the plunger spring. The diaphragmn forms a movable wall portion of a casing between which and the body of the valve a peripheral portion of the diaphragm is clamped. The chamber formed in the casing by the diaphragm is connected by means including two parallel passages with a source of fluid whose supply pressure may be subject to change. An adjustable throttle valve is provided in one of these parallel passages for controlling the rate of flow of fluid into and out of the chamber in the casing and a check valve is provided in the other of these parallel passages to permit the flow of fluid into a chamber in the casing and to prohibit its flow therefrom. Thus fluid can be supplied to the chamber in the casing at a more rapid rate than it can be exhausted therefrom.

With this organization of parts, when the fluid pressure in the casing chamber moves the flexible diaphragm against the biasing force of the plunger spring, the valve is opened and the plunger moves toward the switch to actuate it after a predetermined travel, the time for which is determined by the rate at which fluid is supplied to the chamber through both of the parallel passages leading thereto. Conversely if the pressure of the plunger spring overcomes the water pressure on the diaphragm, the plunger moves in the reverse direction to open the switch and thereafter to close the valve after a time delay determined by the flow of fluid through only one of the parallel passages. The time intervals between operation of the valve and operation of the switch and their reverse operations are different by reason of the operation of the check valve in one of the parallel passages to the chamber in the casing. Suitable overtravel of the plunger relative to the switch is provided so that momentary loss of fluid pressure in the casing chamber will not cause operation of the switch. In this way it provides the protection heretofore obtained from thermal-type time-delay devices associated with a pressure switch to prevent outage due only to momentary loss of cooling water pressure. It consequently acts as an integrating device responsive to the heating of the apparatus due to lack of adequate water cooling and will only open the switch to shut down the apparatus if drops below a desired water pressure suitable for adequate cooling become too frequent.

This pilot operated control device may be used to secure the desired operation of a gas-arc welding apparatus by connecting the pressure chamber in its casing through the parallel passages thereto to the cooling water supply, by connecting the valve thereof in the gas supply line of the welding apparatus, and by connecting the switch thereof in a circuit which operates a contactor which controls the supply of welding current to the electrode of the apparatus and to the work. The welding operation is initiated by opening a valve in the cooling water line to supply cooling water to the welding apparatus and to apply its pressure to the control device, and the welding operation is terminated by closing this valve. This valve in the water line may be a solenoid valve whose operation is controlled by a push button mounted on the welding torch and having contacts in circuit with the solenoid winding of the valve. Then, with a proper adjustment of the device, if the cooling water supply pressure is sufficient to provide suitable cooling of the apparatus, it supplies to the diaphragm of the device a pressure greater than the spring pressure applied to the plunger of the device, the gas valve is opened to supply gas to and about the electrode and the work and, after a delay period, the switch is operated to complete the welding circuit to the electrode and the work and thus permit striking the welding arc to initiate the welding operation. Thereafter, as pointed out above, if the supply pressure of the cooling water falls for an integrated time period to a value which would provide inadequate cooling of the apparatus, the spring biased plunger will move in a reverse direction opening the switch to interrupt the supply of welding current to the arc and, after a delay period, to close the gas valve and prevent waste of the shielding gas.

Figure 2:
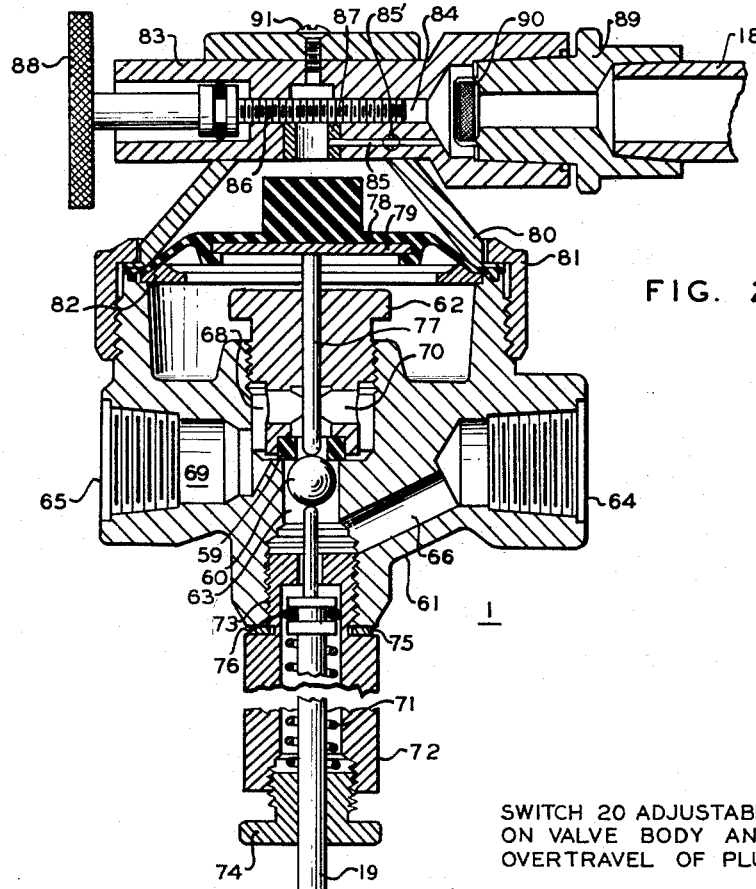
Figure 3:
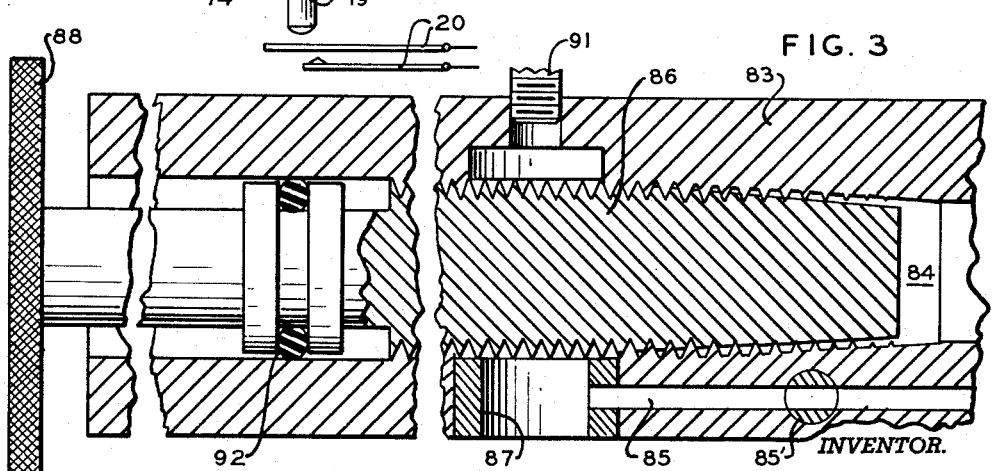

My invention will be better understood by considering in detail the construction of one embodiment thereof and its use as part of a gas-arc welding apparatus as shown in the accompanying drawings wherein:

FIG. 1 shows my pilot operated control device as part of a gas-arc welding apparatus, FIG. 2 is a cross-sectional view of this device showing the working parts thereof, and FIG. 3 is a cross-sectional view showing the construction of the adjustable throttle valve forming part of the device.

In FIG. 1 my control device 1 is connected to control the flow of shielding gas through pipes 2 and 3 from a gas cylinder 4 to a manual gas-arc welding torch 5 having a handle 6 and a head 7. The rate of gas flow is determined by a pressure regulator 8 and indicated by a direct reading flowmeter 9. The gas supplied to torch 5 is discharged through its nozzle 10 about a tungsten electrode 11 supported in an electrode holder forming part of the torch. Cooling water is supplied to the torch from a supply pipe 12 through a solenoid operated valve 13, which is biased to its closed position, a pipe 14, an adjustable throttle valve 15, and a pipe 16 and is exhausted from the torch through a pipe 17. A pipe connection 18 applies the pressure of the water supply to the control device 1.

Control device 1 has a movable plunger 19 which engages and operates a switch 20. This switch is adjustably positioned relative to the body portion of the control device on which it may be mounted as a part thereof and its blades are sufficiently deformable so as to permit overtravel of the plunger after it has closed the switch contacts. Switch 20 is connected in circuit with conductors 23 and 24, contacts 25 of a relay 26, a conductor 27, the operating winding 28 of a contactor 29, and a conductor 30 across supply conductors 21, 22. The operating winding 31 of relay 26 is connected across supply conductors 21, 22 through a conductor 32, contacts 33 of a push button switch 34, and conductors 35, 36 and 37. The operating winding 38 of the solenoid water valve 13 is connected across supply conductors 21, 22 through conductor 32, contacts 33 of push button switch 34, and conductors 35 and 35'. Contacts 58 of contactor 29 connects the output circuit of the welder 39 to the electrode 11 of the welding torch and to the work 40 through conductors 41, 42 and 43, the secondary winding 44 of a coupling transformer 45, and a conductor 46. The welder 39 is energized from the supply conductors 21, 22 through conductors 47 and 48, a disconnect switch 49 and a conductor 50. Contacts 51 of contactor 29 connects the input circuit of a high frequency oscillator 52 across the supply conductors 21, 22 through conductors 30, 53 and 54, a disconnect switch 55, and a conductor 56. The output circuit of the oscillator 52 is connected across the primary winding 57 of the coupling transformer 45. A high frequency bypass capacitor 45' is connected across the welding conductors 46 and 42 so that for arc starting and arc stabilization the high frequency of the oscillator can be supplied across electrode 11 and work 40 without passing through the welder.

To prepare the system of FIG. 1 for welding, the operator opens the valve on cylinder 4 to supply shielding gas through pipe 2 to the gas valve in device 1 which is biased to its closed position and consequently prevents the flow of gas through pipe 3 to the welding torch 5. He will also close disconnect switches 49 and 55 to prepare for the use of welder 39 and oscillator 52. Thereafter he may initiate a welding operation by closing push button switch 34.

Closure of switch 34 will energize the operating winding 38 of solenoid valve 13 and the operating winding 31 of relay 26. Energization of winding 38 opens valve 13 from its biased closed position and supplies cooling water through pipe 14, throttle valve 15 and pipe 16 to the welding torch from which it is exhausted through pipe 17. At the same time water pressure is applied to device 1 through pipe 18 and it operates to open its gas valve and permit the flow of shielding gas from cylinder 4 through pipes 2 and 3 to the welding torch 5 from which it is discharged through its nozzle 10 about its welding electrode 11. The energizing of winding 31 of relay 26 closes its contacts 25 and thus places the energization of the operating winding 28 of contactor 29 under the control of switch 20 of device 1.

After a pre-weld time-delay period device 1 closes switch 20 by movement of its plunger 19 and operating winding 28 of contactor 29 is energized causing it to close its contacts 58 and 51. The closure of its contacts 58 connects the output circuit of welder 39 across the electrode 11 of torch 5 and the work 40 through the secondary winding 44 of the coupling transformer 45. The closure of its contacts 51 completes the input circuit to high frequency oscillator 52 which consequently operates to supply high frequency voltage and current to the primary winding 57 of coupling transformer 45. This energization of the coupling transformer 45 applies the high frequency of the oscillator across the electrode 11 of the torch 5 and the work 40 to enable the operator to strike the welding arc without touching the electrode to the work and thereafter to maintain its operation with arc welding current supplied from welder 39.

As pointed out above, device 1 is so constructed that there is suitable overtravel of plunger 19 after it operates switch 20. This is employed to take care of momentary drops in cooling water pressure so that shut down will not occur due to those momentary pressure drops which are not frequent enough to produce destructive heating of the welding apparatus. If during the welding operation the cooling water pressure drops to a value less than that for which the device 1 is set, it will, after a delay period suitable to take care of momentary pressure drops, open switch 20 and de-energize contactor 29 which will open its contacts to deenergize oscillator 52 and disconnect welder 39 from the welding circuit. After the post-weld delay period for which device 1 is set, the flow of gas to the torch will also be interrupted.

The operator can discontinue the welding operation by opening push button switch 34 which will de-energize relay 26 and solenoid valve 13. De-energization of solenoid valve 13 will permit it to close and thus interrupt the flow of cooling water to the welding torch. This removal of water pressure from device 1 will cause it to close its gas valve after a post-weld time delay period and thus interrupt the flow of shielding gas to the torch. The de-energization of relay 26 de-energizes contactor 29 which disconnects welder 39 from the welding circuit and de-energizes oscillator 52, thus interrupting the welding operation.

The gas valve of device 1 comprises a ported seat member 59, a movable spherical ball valve member 60, and a body portion 61 with a passage therethrough which is variously obstructed by the relative positions of these members. The seat member 59 is held intermediate the ends of the valve passage by a plug 62 which makes a threaded engagement with an internal socket in the valve body. The valve member 60 is located in and guided by a bore 63 which is in the valve body and located opposite the seat member 59. The valve passage extends between inlet socket 64 and outlet socket 65 and comprises bores 66, 63, 68 and 69 formed in the valve body and bores 70 formed in the projecting end portion of plug 62 which is located in bore 68 and spaced from the side wall thereof. Inlet and outlet sockets 64 and 65 are threaded to provide connections for fittings on the ends of gas pipes 2 and 3 previously described as forming part of the apparatus of FIG. 1.

The inner end of plunger 19 of device 1 engages valve element 60 and is forced there against by spring 71 which biases it to close the port in seat member 59. Plunger 19 and its biasing spring 71 are located in the longitudinal cavity of a holder 72 one end of which is reduced in size and makes a threaded engagement with a socket 73 formed in the valve body. The closing force exerted on valve member 60 by plunger 19 is made adjustable by means of a screw 74 which makes a threaded engagement with the outer end wall of the spring cavity in holder 72 and acts against one end of spring 71. The other end of this spring engages and acts on a collar on the inner end of plunger 19 and between this collar and an adjacent collar spaced therefrom there is an O ring seal 76 to prevent gas escaping by the plunger and through its holder. A packing washer 75 between shouldered portions of holder 72 and valve body 61 also prevents the escape of gas from the valve body at the joint between these parts. Adjusting screw 74 has a longitudinal bearing through which plunger 19 extends and by which it is guided in its movements relative thereto.

The gas valve is opened by the force applied to its movable valve element 60 by a thrust pin 77 which extends through and is guided by plug 62 which also serves to hold the valve seat 59 in place in the valve body. One end of this thrust pin extends through the port in seat member 59 and engages the side of valve member 60 which is opposite the side thereof which is engaged by the inner end of plunger 19. This thrust pin is actuated by a flexible diaphragm 78 which engages its other end through a thrust plate 79 forming part of the diaphragm structure.

Diaphragm 78 constitutes a movable wall member which closes a wall opening in a casing 80 forming part of the pilot mechanism of my device. A peripheral portion of diaphragm 78 is held between casing 80 and the valve body by a coupling nut 81. A back-up ring 82 supported on the valve body and positioned to engage a peripheral portion of the diaphragm which is exterior to the cavity in casing 80 limits the bellowing thereof in its movement away from the casing.

Casing 80 is provided with a head 83 having parallel passages 84 and 85 therein through which the flow of water from pipe 18 into and out of the chamber in the casing is controlled. An adjustable throttle valve 86 in passage 84 controls the rate of flow of water to and from the chamber in casing 80 and a check valve 87 in passage 85 permits the flow of water into the casing chamber but prohibits its flow therefrom. Throttle valve 86 is adjusted by rotation of a hand wheel 88 which is attached to the end of a part of the valve which projects from one end of casing head 83. The other end of this casing head terminates in a socket which communicates with passages 84 and 85 therein and forms a connection for a fitting 89 attached to the end of water pressure pipe 18. This fitting is provided with a filter 90 to keep dirt out of the orifices of valves 86 and 87. Filter clogging is unlikely since in this area the same water surges in and out of the device during the operation thereof.

A screw 91, whose head structure forms a seal in a short countersunk entrance to the threads therefore in the valve body is provided to vent air from the chamber in casing 80. Backing the screw out a half turn will allow sufficient leakage past the threads to vent the air, after which screw 91 is tightened.

The body portion 61 of my device is a modification of a like part of a pressure regulator and will consequently have a passage from the low pressure or outlet side of the valve to the chamber which is on the other side of diaphragm 78 from that of the water pressure chamber in casing 80. When the gas valve is open this gas pressure is low, being of the order of two pounds per square inch, and will consequently have no obstructing effect on the operation of my device in response to the much higher cooling water pressure in the chamber of casing 80.

Check valve 87 in passage 85 of the casing head comprises a length of flexible tubing making a slight interference fit in the exit hole of throttle valve 86. This hole forms part of passage 85 and extends into the casing chamber. The flexible tubing is deformable relatively to the wall of the hole in which it is located when the water pressure in pipe 18 is slightly greater than the water pressure in casing 80 to allow the supply of water through passage 85 into the casing. When the water pressure in the casing is greater than that in pipe 18, flow of water from the casing through passage 85 is prevented by the sealing action between the wall surface of the length of flexible tubing and the wall surface of the hole in which it is located. Any flow of fluid from the chamber in casing 80 must consequently be through throttle valve 86.

The physical structure of the throttle valve is shown in FIG. 3. It comprises internal and external screw members of circular cross section interposed in passage 84 and adapted to make a threaded engagement with one another along portions thereof wherein lengths of thread of each of the members have been fully formed and are of equal and complementary depth and adjacent which are other portions of said members wherein the top of the thread of one member is progressively spaced along the length thereof by an increased amount from the bottom of the groove between the thread on the other of said members to form a tapered passage between the threads. The internally threaded member has an exit hole therein to that portion thereof having a fully formed length of thread and it is through this hole that water passes into and out of the chamber in casing 80 under the control imposed by the relative adjustment of the screw members of the throttle valve. The above described adjustable orifice through the throttle valve may be constructed by tapping the internal thread with a standard starting tap, not allowing any cutting at the bottom of the thread hole, and by machining off the ends of the threads of the externally threaded member to the same taper as the end of the starting tap. Sufficient full threads are left at either side of the exit hole to keep the externally threaded screw member concentric with the bore of the internal screw member. With this arrangement a very smooth flow control is obtained at the equivalent of a small orifice and the construction described has the advantage of being easily cleaned by merely tightening and loosening the threads a few times.

Handle 88 on the stem of the external screw member of the throttle valve constitutes means for rotating one of the screw members relatively to the other to move them longitudinally of one another and thereby vary the position of the tapered passageway between the threads of these members relative to the exit hole in one of the members. An O ring seal 92 between spaced collars on the stem of the externally threaded screw member engages the wall surface of a cavity extending beyond the threaded portion of the internal screw member to prevent leakage of water from the valve.

In view of the detailed description above given of the structure of the pilot operated control device of my invention, its operation is apparent in view of the previously given general description thereof and what has been previously stated relative thereto in describing the organization and operation of the gas-arc welding system of FIG. 1 of which it forms a part. The following is a recommended procedure for adjusting the device. With switch 20 positioned relative to plunger 19 for a minimum pre-weld gas flow time, spring 71 is compressed by adjusting screw 74 to provide for the desired cut-off water pressure. Throttle valve 86 is then adjusted for the post-weld gas shielding time and then switch 20 is adjusted relative to plunger 19 for the desired pre-weld gas flow time. If this time is long and the water pressure is low, it may be necessary to repeat these steps. As shown in FIG. 2 a throttle valve 85' may be placed in passage 85 so that a change of the pre-weld gas flow time may be obtained by controlling the rate of water flow through passage 85. Such an adjustment will not affect the minimum pressure setting determined by the compression of plunger spring 71. Alternately some well known linkage might be employed for acting on plunger spring 71 to permit a wide variation in the pre-weld gas flow time adjustment without affecting the minimum pressure setting for cut-out due to low water pressure. The device will operate best with fifteen pounds or more pressure differential between the supply pressure and the pressure cut-out setting. Preferably full line pressure is applied directly to the device by having the throttling valve for controlling the flow of water to the welding torch located down stream of the device as shown in FIG. 1. This will eliminate the time necessary to build up back pressure in the flexible hoses of the welding equipment which would otherwise cause a delay between the initiation of water flow and gas flow. It is of course understood that pipes 3, 16 and 17 of FIG. 1, which extend from the rear end of handle 6 of the welding torch 5 will be made flexible in order to provide the welding operator with that freedom of manipulation which he requires when performing a welding operation.

The water pressure sensitive device above described may be converted into a flow sensitive device by adding a second diaphragm and a restricting orifice in the water line in accordance with the disclosure in Patent 2,517,739, Joseph M. Tyner and myself, August 8, 1950. It is contemplated that operation with such a modification will produce better performance at a water pressure close to the minimum required, but the pressure spring would need be much weaker and thus require a very good valve seat and low friction in the plunger seal.

These and other modifications will occur to those skilled in the art in view of the above description of the structure and use of my pilot operated control device. It is of course apparent that the device may be used for purposes other than sequencing the operation of a gas-arc welding apparatus. For example, it could be adapted to perform the "ease-on" function for thermo-chemical piercing. It could also be used to control the gas flow in gas shielded arc welding by using the pressure of the gas to control operation of the device.

Thus, while I have fully described but one modification of my invention, other modifications and adaptations thereof in addition to those suggested will readily occur to those skilled in the art. It is consequently my intention to cover by the appended claims all such modifications and adaptations of my invention which do not constitute a departure from the spirit and scope thereof.

What I claim is:

1. In a gas-arc system adapted to be supplied with shielding gas and electric welding current, and comprising a gas-arc torch, a valve interposed in the conduit through which said shielding gas is supplied to said torch, and a switch interposed in a circuit controlling the flow of electric welding current to said torch: apparatus for the sequential control of the flow of said shielding gas relative to welding current for proper pre-weld and post-weld gas flow, comprising a control fluid chamber, a control element associated with said control fluid chamber which is displaced in a forward direction upon admission of control fluid under pressure to said control fluid chamber and which is displaced in the reverse direction upon discharge of control fluid from said control fluid chamber, means responsive to the displacement of said control element to operate said valve and said switch in pre-determined sequence in a forward direction and in a reverse sequence in the reverse direction and metering rate means for controlling at differing rates the respective admission and discharge of control fluid to and from said chamber, to thereby cause a time delay period of a different duration as between operation of said valve and operation of said switch in that order in their forward direction, and operation of said switch and operation of said valve in that order in the reverse direction.

2. In a gas-arc system adapted to be supplied with shielding gas and electric welding current and comprising a gas-arc torch, and a switch interposed in a circuit controlling the flow of electric welding current to said torch: apparatus for the sequential control of the flow of said shielding gas relative to welding current for proper pre-weld and post-weld gas flow, comprising a control fluid chamber, a control element associated with said control fluid chamber which is displaced in a given direction upon admission of control fluid under pressure to said control fluid chamber and which is displaced in the opposite direction upon discharge of control fluid from said control fluid chamber, a valve interposed in the conduit through which said shielding gas is supplied to said torch, means responsive to the displacement of said control element to operate said valve and said switch in pre-determined sequence both in a forward direction and in a reverse direction, and metering rate means for controlling at differing rates the respective admission and discharge of control fluid to and from said chamber, to thereby cause a time delay period of a different duration as between operation of said valve and operation of said switch in that order in their forward direction, and operation of said switch and operation of said valve in that order in the reverse direction, said metering rate means effectively restricting the aforesaid admission of control fluid so as to afford a pre-determined delay interval between the pre-weld operation of said gas flow and the operation of welding current flow, and more greatly restricting the aforesaid discharge of control fluid so as to afford a longer interval between termination of the welding current flow and termination of the post-weld operation of the shielding gas flow.

3. In a gas-arc system adapted to be supplied with shielding gas and electric current and comprising a gas-arc torch, and a valve interposed in the conduit through which said shielding gas is supplied to said torch: apparatus for the sequential control of the flow of said shielding gas relative to electric current for proper pre-weld and post-weld gas flow, comprising a switch interposed in a circuit controlling the flow of electric current to said torch, a control fluid chamber, a control element associated with said control fluid chamber which is displaced in a given direction upon admission of control fluid under pressure to said control fluid chamber and which is displaced in the opposite direction upon discharge of control fluid from said control fluid chamber, means responsive to the displacement of said control element to operate said valve and said switch in pre-determined sequence both in a forward direction and in a reverse direction, and metering rate means for controlling at differing rates the respective admission and discharge of control fluid to and from said chamber, to thereby cause a time delay period of a different duration as between operation of said valve and operation of said switch in that order in their forward direction, and operation of said switch and operation of said valve in that order in the reverse direction, said metering rate means effectively restricting the aforesaid discharge of control fluid so as to afford a pre-determined long interval for delaying termination of the operation of both said switch and said current flow in said reverse direction, and another pre-determined long interval between the termination of the current flow and the termination of the post-weld operation of the shielding gas flow.

4. In a gas-arc system comprising a coolant-cooled torch which is adapted to be supplied with shielding gas and electric current, a shielding gas conduit connected to said torch through which shielding gas is supplied thereto, and a coolant conduit connected to said torch through which coolant is supplied thereto: improved controlling apparatus comprising a switch interposed in a circuit controlling the flow of electric current to said torch, and a single control unit having plural components consolidated therein for the sequential control of the flow of said shielding gas relative to said electric current flow for proper pre-weld and post-weld gas flow, and consisting of a control fluid chamber, a control element associated with said fluid chamber which is displaced in a forward direction upon admission of control fluid under pressure to said fluid chamber and which is displaced in a reverse direction upon discharge of control fluid from said fluid chamber, a gas valve interposed in said shielding gas conduit, means responsive to the displacement of said control element to operate the gas valve and said switch in pre-determined sequence both in a forward direction and in a reverse direction, means connected to said coolant conduit and effective for supplying said coolant under pressure as a control fluid to the fluid chamber, and a metering rate control for controlling at differing rates the respective admission and discharge of control fluid to and from said chamber, to thereby cause a time delay period of a different duration as between operation of the gas valve and operation of said switch and operation of said valve in that order in the reverse direction, said metering rate control comprising passage means in said coolant-conduit-connected means, the number of said passage means consisting of at least one restricted passage in number, and having restriction adjusting means therein for adjustably restricting the flow of control fluid therethrough into said fluid chamber, to adjust the pre-weld time delay of said switch to a period sufficient for proper prior purge-flow of said shielding gas.

5. In a gas-arc system adapted to be supplied with shielding gas and electric welding current, and comprising a gas-arc torch, a shielding gas conduit through which shielding gas is supplied to said torch, a cooling fluid conduit to said torch through which cooling fluid is supplied thereto, and a switch interposed in a circuit controlling the flow of electric welding current to said torch: a single control device unit having plural components consolidated therein for the sequential control of the flow of said shielding gas relative to welding current for proper pre-weld and post-weld gas flow, and consisting of a fluid chamber adapted to be supplied with said cooling fluid, a control element associated with said fluid chamber which is displaced in a forward direction upon admission of cooling fluid under pressure to said fluid chamber and which is displaced in a reverse direction upon discharge of cooling fluid from said fluid chamber, a gas valve for connection in said shielding gas conduit to control the flow of gas supplied to the torch, means responsive to the displacement of said control element to operate said gas valve and said switch in pre-determined sequence both in a forward direction and in a reverse direction, means for supplying said cooling fluid from said cooling fluid conduit to the fluid chamber, and plural metering rate means for controlling at differing rates the respective admission and discharge of cooling fluid to and from said chamber, to thereby cause a time delay period of a different duration as between operation of said gas valve and operation of said switch in that order in their forward direction and operation of said switch and operation of said gas valve in that order in the reverse direction.

6. Single control device unit in a system in accordance with claim 5, wherein said plural metering rate means consists of first and second parallel passages in said means for supplying said cooling fluid to the fluid chamber, adjustable restrictive means in said first passage for adjustably controlling the rate at which cooling fluid passes therethrough into and out of said chamber, and means including adjustable restrictive means in said second passage and adjustably restricting the flow of cooling fluid therethrough into said chamber and prohibiting the flow of said fluid therethrough from said chamber.

7. Apparatus according to claim 1 in which the means for controlling the rate of admission and discharge of control fluid to and from said control chamber consists of a pair of flow restricting fluid passages in parallel relation and a check valve in one of said passages.

8. Apparatus according to claim 7 in which at least one of said parallel passages includes an adjustable flow control valve.

9. Apparatus comprising a valve having a body portion with a passage therethrough and a valve element movable relatively to said body portion for variously obstructing said passage, a casing, a flexible diaphragm, means for clamping the periphery of said diaphragm between said casing and the body portion of said valve to form a pressure chamber in said casing, a thrust pin mounted for lengthwise movement in said valve body and positioned thereby in contact with and intermediate said diaphragm and said valve member, a plunger, a holder for guiding said plunger lengthwise thereof and from which one end of said plunger projects, means in said holder for biasing said plunger in the direction of its said projecting end, means in said holder for adjusting the force of said biasing means, means for mounting said holder in said valve body with said projecting end of said plunger in engagement with said valve member against which it acts by its said biasing means to resist the force applied to said valve member by said diaphragm acting through said thrust pin, means including parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of fluid therefrom.

10. Apparatus comprising a valve having a ported seat member, a movable spherical ball valve member and a body portion with a passage therethrough which is variously obstructed by the relative positions of said members therein, a casing, a flexible diaphragm, means for clamping the periphery of said diaphragm between said casing and the body portion of said valve to form a pressure chamber in said casing, a plug engaging said valve body and holding said seat member intermediate the ends of said passage in said valve body and opposite the end of a bore in said body member which guides said ball valve member relative to the port in said member, a thrust pin extending through said plug and guided thereby into contact with and intermedate said diaphragm and said ball valve member with one end thereof extending through the port in said seat member, a plunger mounted for lengthwise movement in said valve body with one end thereof opposite said ball valve member, means for biasing said plunger into engagement with said ball valve member and against a force applied thereto by said diaphragm acting through said thrust pin, means for adjusting the force of said biasing means, means including parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of said fluid therefrom.

11. Apparatus comprising a valve having a body portion with a passage therethrough and a valve element movable relatively to said body portion for variously obstructing said passage, a casing, a flexible diaphragm, means for clamping the periphery of said diaphragm between said casing and the body portion of said valve to form a pressure chamber in said casing, means for limiting the bellowing of said diaphragm in its movement away from said casing, said means including a back-up washer supported on said valve body and positioned to engage a peripheral portion of said diaphragm which is exterior to said casing, a thrust pin mounted for lengthwise movement in said valve body and positioned thereby in contact with and intermediate said diaphragm and said valve member, a plunger, a holder for guiding said plunger lengthwise thereof and from which one end of said plunger projects, means in said holder for biasing said plunger in the direction of its said projecting end, means in said holder for adjusting the force of said biasing means, means for mounting said holder in said valve body with said projecting end of said plunger in engagement with said valve member against which it acts by its said biasing means to resist the force applied to said valve member by said diaphragm acting through said thrust pin, means including parallel passages for connecting such pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of fluid therefrom.

12. Apparatus comprising a valve having a ported seat member, a movable spherical ball valve member and a body portion with a passage therethrough which is variously obstructed by the relative positions of said members therein, a casing, a flexible diaphragm, means for clamping the periphery of said diaphragm between said casing and the body portion of said valve to form a pressure chamber in said casing, means for limiting the bellowing of said diaphragm in its movement away from said casing, said means including a back-up washer supported on said valve body and positioned to engage a peripheral portion of said diaphragm which is exterior to said casing, a plug engaging said valve body and holding said seat member intermediate the ends of said passage in said valve body and opposite the end of a bore in said body member which guides said ball valve member relative to the port in said seat member, a thrust pin extending through said plug and guided thereby into contact with and intermediate said diaphragm and said ball valve member with one end thereof extending through the port in said seat member, a plunger mounted for lengthwise movement in said valve body with one end thereof opposite said ball valve member, means for biasing said plunger into engagement with said ball valve member and against a force applied thereto by said diaphragm acting through said thrust pin, means for adjusting the force of said biasing means, means including first and second parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of said fluid therefrom.

13. Apparatus comprising a valve having a body portion with a passage therethrough and a valve element movable relatively to said body portion for variously obstructing said passage, a casing, a flexible diaphragm, means for clamping the periphery of said diaphragm between said casing and the body portion of said valve to form a pressure chamber in said casing, a thrust pin mounted for lengthwise movement in the body portion of said valve and positioned thereby in contact with and intermediate said diaphragm and said valve element, a spring biased plunger mounted in the body portion of said valve and having one end projecting therefrom and its other end in biased engagement with the side of said valve element which is opposite its side engaged by said thrust pin, means including parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of fluid therefrom.

14. Apparatus comprising a valve having a body portion with a passage therethrough and a valve element movable relatively to said body portion for variously obstructing said passage, a casing, a flexible diaphragm, means for clamping the periphery of said diaphragm between said casing and the body portion of said valve to form a pressure chamber in said casing, a thrust pin mounted for lengthwise movement in the body portion of said valve and positioned thereby in contact with and intermediate said diaphragm and said valve element, a plunger, a holder for guiding said plunger lengthwise thereof and from which the ends of said plunger project, means for mounting said holder in the body portion of said valve with one end of said plunger opposite the side of said valve element which is opposite its side engaged by said thrust pin and with its other end projecting from the body portion of said valve, means in said holder for biasing said plunger into engagement with said valve element to resist the force applied thereto by said diaphragm acting through said thrust pin, means in said holder for adjusting the force of said biasing means, means including parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of fluid therefrom.

15. Apparatus comprising a valve having a ported seat member, a movable spherical ball valve member and a body portion with a passage therethrough which is variously obstructed by the relative positions of said members therein, a casing, a flexible diaphragm, means for clamping the periphery of said diaphragm between said casing and the body portion of said valve to form a pressure chamber in said casing, a plug engaging the body portion of said valve and holding said seat member intermediate the ends of said passage therein and opposite the end of a bore in the body portion of said valve which guides said ball valve member relative to the port in said seat member, a thrust pin extending through said plug and guided thereby into contact with and intermediate said diaphragm and said ball valve member with one end thereof extending through the port in said seat member, a plunger, a holder for guiding said plunger lengthwise thereof and from which the ends of said plunger project, means for mounting said holder in the body portion of said valve with one end of said plunger opposite the side of said ball valve member which is opposite its side engaged by said thrust pin and with its other end projecting from the body portion of said valve, means in said holder for biasing said plunger into engagement with said ball valve member to resist the force applied thereto by said diaphragm acting through said thrust pin, means in said holder for adjusting the force of said biasing means, means including parallel passages for connecting said pressure chamber in said casing with a source of fluid whose supply pressure is subject to change, means in one of said parallel passages of said connecting means for adjustably controlling the rate at which fluid passes through said one parallel passage into and out of said pressure chamber in said casing, and means in the other of said parallel passages of said connecting means for permitting the flow of fluid through said other parallel passage into said pressure chamber in said casing and prohibiting the flow of said fluid therefrom.

References Cited in the file of this patent
UNITED STATES PATENTS

| | | |
|---|---|---|
| 2,510,207 | Behnke et al. | June 6, 1950 |
| 2,517,739 | Tyrner et al. | Aug. 8, 1950 |